United States Patent Office 2,937,120
Patented May 17, 1960

2,937,120

PROCESS FOR OBTAINING INTRINSIC FACTOR

Leroy G. Sinn, Indianapolis, Ind., assignor to Eli Lilly and Company, Indianapolis, Ind., a corporation of Indiana No Drawing. Application September 16, 1957
Serial No. 683,938

14 Claims. (Cl. 167—74)

This invention relates to a novel process for obtaining intrinsic factor preparations of enhanced potency in high yields from low potency materials of mammalian source.

It is well known that humans with pernicious anemia have a deficiency of a substance or substances broadly denominated intrinsic factor, the presence of which is believed necessary for absorption of orally administered vitamin $B_{12}$. To alleviate the deficiency, intrinsic factor preparations are orally administered along with vitamin $B_{12}$.

Intrinsic factor whose chemical structure is yet unknown is present in various mammalian tissues, and in secretions such as gastric juice. Crude intrinsic factor preparations of low potency can be readily obtained from such sources. However, extensive efforts by various workers have heretofore failed to yield a process that would provide in good yield high potency, purified intrinsic factor preparations from low potency material. A desired method would (1) safeguard the especially labile intrinsic factor activity during the process, (2) cause substantially quantitative recovery of activity rather than merely to provide a preparation with some increase in potency, (3) make it possible to omit use of organic solvents, and (4) simultaneously provide higher potency preparations than heretofore known, in a rapid and economic manner.

Although previously known salting out and solvent precipitation methods have brought about some purification, there has been the persistent and insuperable difficulty of selecting the degree of saturation to prevent a distribution of activity between precipitate and supernatant, and yet to provide a preparation of high potency. Another shortcoming of such previously used methods is the necessity of a substantial amount of mechanical stirring which endangers activity because of the pronounced ease of its denaturation and inactivation. Furthermore, if organic solvents are used in the purification process, there is in addition to the usual difficulties associated with such solvent use, the added one of great instability of intrinsic factor in said solvents.

An object of this invention is the provision of an economical and efficient process of obtaining highly potent intrinsic factor preparations. Other objects of this invention will become apparent forthwith.

I have found that I can obtain intrinsic factor in relatively pure form by enzymatically hydrolysing crude intrinsic factor with a proteolytic enzyme, contacting the hydrolysate with a carboxylic cation exchange resin to cause adsorption of the intrinsic factor, washing said carboxylic cation exchange resin with a compatible aqueous solution of increasing electrolyte concentration to cause elution of the adsorbed intrinsic factor, and recovering the intrinsic factor from the eluate.

Broadly speaking, the manner of carrying out this invention is as follows: A crude intrinsic factor preparation, as is, for example, obtained from the pyloric sections of hog stomachs, is enzymatically hydrolyzed with a proteolytic enzyme, e.g., pancreatin. The hydrolysate, if desired, is dialysed using a suitable membrane which permits the passage from the hydrolysate of low molecular weight inactive materials. A flocculent inactive precipitate, which is usually present in the hydrolysate on dialysis, is preferably removed as by centrifugation. The hydrolysate is then applied to a properly prepared carboxylic ion exchange resin column. It is preferred that the hydrolysate when applied to the carboxylic ion exchange resin column be in aqueous solution with a solid content of about 2 percent. The resin column to which the hydrolysate is applied is preferably maintained at about 3° C. and buffered to a suitable pH, e.g., about pH 5. The intrinsic factor is eluted by passing over the column a solution of an electrolyte compatible with intrinsic factor and the resin. The electrolyte concentration is increased in the elution procedure using a gradient type elution wherein there is a continuous and gradual increase in concentration. Alternatively, the electrolyte concentration of the eluting solution can be increased incrementally. Those eluate fractions containing the intrinsic factor are combined, and a highly potent intrinsic factor preparation is recovered from them.

The starting impure intrinsic factor preparations employed in the process generally are derived from pyloric sections of hog stomachs. However, preparations obtained from other source materials can also be used. The starting preparations used in this invention can have a wide range of potency. For example, suitable preparations are those which in amounts of about 25 to about 250 mg. have a potency in the Schilling urinary excretion assay of the intrinsic factor activity of 1 U.S.P. unit.

The enzymes which can be used in the process are proteolytic enzymes, such including for example pancreatin, trypsin, chymotrypsin, papain, and the like. It is to be understood that commercially available enzymes are usually not completely pure but contain various other enzymatic activities in addition to the specific proteolytic activity believed to be possessed by the pure enzymes. Other such activities include, for example, amylolytic and lipolytic activities. These activities apparently do not adversely affect the process of this invention.

An illustrative enzymatic hydrolysis employing pancreatin, for example, is carried out in the following manner: The above-described starting impure intrinsic factor preparation is dissolved in water, preferably in not less than 0.5 percent concentration. Pancreatin is added in the amount of about 1 g. for each 80 g. of crude intrinsic factor, and the mixture is hyrolyzed at a temperature of about 37° C. and a pH of about pH 7.5 to pH 8.0. The duration of the hydrolysis is not critical, but can be between about one and ten hours. There is no apparent advantage in extending hydrolysis time beyond ten hours.

The resin employed for adsorbing the intrinsic factor is a carboxylic cation exchange resin, and for the purposes of this invention the resin may be any of the carboxylic type resins which are available. I have found "Amberlite XE–64 (a carboxylic cation exchange resin obtained from Rohm and Haas Company) to be highly effective in providing efficient adsorption and release of the intrinsic factor. Other suitable carboxylic ion exchange resins include the Rohm and Haas Company resin sold under the name "Amberlite" IRC–50, that sold by The Permutit Company under the name "Permutit" H–70 and carboxymethylcellulose prepared by the method described by Peterson and Sober, J. Am. Chem. Soc., 78, 756 (1956).

For most effective use in the process of this invention, the resin should be properly conditioned, as by removal of the "fines," and the adjustment of the resin to a pH most favorable to adsorption of the factor. Suitable pretreatment of the resin is readily accomplished by the method described by Hirs, Moore, and Stein in J. Biol.

Chem., 200, 493 (1953). The resin thus obtained in the hydrogen cycle is buffered at a pH between about pH 4 and pH 7 with one of the buffers described herein below. The carboxymethylcellulose resin and other resins are prepared for this invention in like manner.

The buffer used can be any buffer that is compatible with intrinsic factor and the resin. Some of those that can be used are, for example, acetate, formate, citrate, phosphate, lactate, and like buffers in which the cation of the electrolyte used in gradient elution can be sodium, potassium, ammonium, pyridine, and the like. Gradient elution of the intrinsic factor can also be effected with mineral and organic acids, such as for example, hydrochloric and acetic acids.

The following example more specifically illustrates the invention but is not meant to be limiting upon the scope of the invention.

Crude intrinsic factor was prepared from hog pyloric sections by the method of Prusoff, Welch, Heinle, and Meecham, Blood, 8, 491 (1953). The preparation upon assay by the Schilling assay procedure described in J. Lab. and Clin. Med. 42:860, 1953 showed that 50 mg. of the crude preparation had a potency of the intrinsic factor activity of 1 U.S.P. unit.

5000 mg. of the crude preparation were dissolved in 1000 ml. of water and the solution was adjusted to about pH 7.8 by the addition of 10 percent sodium hydroxide solution. During the addition, the solution was gently stirred. To the solution were added 50 mg. of pancreatin (1-80 casein digestive power), the solution was stirred gently to distribute the enzyme evenly, and the mixture was maintained for about five hours at 37° C. during which time enzymatic hydrolysis took place. During the hydrolysis period the mixture was maintained at about pH 7.8 by the addition of 10 percent sodium hydroxide solution. At the end of the five-hour period, the hydrolysate was adjusted to about pH 5 by the addition of 10 percent hydrochloric acid with gentle stirring. The hydrolysate was freed from inactive hydrolytic products of small molecular weight, inorganic salts, and the like, by dialysing it against distilled water in Visking membranes which had previously been boiled in distilled water for about two minutes, and subsequently rinsed two times in fresh, cold distilled water. The dialysis was carried on for about forty-eight hours at about 3° C. against about 25 l. of distilled water with frequent changes of the dialysing solution. The impermeate was centrifuged to remove a small amount of flocculent precipitate, and the clear supernatant which contained the intrinsic factor activity was shell-frozen and freeze-dried.

One gram of the freeze-dried intrinsic factor was dissolved in 30 ml. of pH 5.4 sodium acetate buffer (0.05 M sodium ion concentration) and was applied to a carboxylic ion exchange resin column in the following manner:

The resin column was prepared as follows: About 1 l. of "Amberlite" XE-64 resin (carboxylic cation exchange resin sold by Rohm and Haas Company) was washed and cycled substantially by the procedure described by Hirs, Moore and Stein in J. Biol. Chem., 200, 493 (1953). The resin thus obtained in the hydrogen cycle was suspended with vigorous stirring in 2 l. of pH 5.4 sodium acetate buffer (0.05 M sodium ion concentration) and 10 percent sodium hydroxide solution was added from time to time until the pH of the mixture remained constant at about pH 5.4. The buffered resin was allowed to settle, the supernatant was decanted, and the resin was washed twice with 1 l. quantities of sodium acetate buffer of the above concentration and pH.

The washed buffered resin was placed to a depth of about 14 cm. in a glass column having a diameter of 4.7 cm. and a height of 30 cm., equipped at the lower end with a sintered glass disc of medium porosity. The resin bed was washed with about 300 ml. of the sodium acetate buffer, and the above-described intrinsic factor solution was applied to the column, followed by two successive 30 ml. washes of the sodium acetate buffer.

The purified intrinsic factor was eluted from the column by gradient elution technique in the following manner: To the head of the column was attached a reservoir of about 2 l. capacity containing about 1000 ml. of sodium acetate buffer of the same concentration and pH as described above. To the first reservoir was attached a second reservoir of about 4 l. capacity containing sodium acetate buffer having a pH of 5.4 and a sodium ion concentration of 0.58 M. The connection between the first and second reservoirs was air-tight so that as the lower molarity acetate buffer was drawn into the column from the first reservoir, its volume was replenished in the first reservoir by the higher molarity acetate buffer in the second reservoir. The contents of the first reservoir were stirred with a magnetic stirrer to provide even distribution of the more concentrated incoming buffer solution. The buffer solution thus obtained of gradually increasing sodium ion concentration was passed through the column at a flow rate of about 25 ml. per hour, and the eluate was collected in 10 ml. fractions. Aliquots of each fraction were examined to determine their ultraviolet absorptions at 278 m$\mu$, were analyzed for sugar content by the anthrone test procedure as described by Morris in Science, 107, 254 (1948), and were tested quantitatively with ninhydrin reagent. Fractions 10 to 50 comprising a total of about 600 ml. contained the initially eluated material. They strongly absorbed ultraviolet light at 278 m$\mu$, had high sugar content by the anthrone test, and gave high ninhydrin color. Fractions 70 to 85 showed very low both ultraviolet light absorption in the above range and sugar content, but high ninhydrin color. Fractions from about 88 to 115 showed ultraviolet absorption at the above wave length, showed presence of sugar using the above method and gave positive ninhydrin color tests, but all were relatively lower than obtained from fractions 10 to 50. Fractions 88 to 115 contained substantially all the intrinsic factor activity originally applied to the column, and the prior and subsequent fractions were substantially inactive and were discarded. The active fractions were combined and dialysed against several changes of distilled water in Visking membranes prepared as above described to remove the buffer ions, and the resulting impermeate was freeze-dried, yielding 82 mg. of white fluffy material.

The dried instrinsic factor preparation when assayed by the Schilling assay procedure showed that 0.8 mg. had a potency of the intrinsic factor activity of 1 U.S.P. unit. On the basis of the assay and the amount of freeze-dried material obtained, there was substantially complete recovery of all of the activity.

The purified intrinsic factor was rechromatographed by the above procedure, whereby a slight further increase in purity was obtained so that about 0.5 mg. was equivalent in potency to the 0.8 mg. of the above-provided material.

In place of pancreatin which was employed in the foregoing example, other enzymes of proteolytic nature can be used, for example, trypsin, chymotrypsin, papain or like proteolytic enzymes can be used in crude or purified form to provide the hydrolysis desirable in the process of this invention. As will readily be understood, the amount of enzyme employed and the conditions under which hydrolysis is carried out will depend upon the particular enzyme used.

Various buffers of appropriate buffering range can be used such as, for example, sodium citrate, potassium phosphate, pyridine formate, ammonium acetate and the like. The volatile buffers such as ammonium acetate and pyridine formate have the added advantage that they can be removed from the eluate fraction containing intrinsic factor activity by freeze-drying, thus eliminating any necessity of dialysis of the column eluate. Elution can also be carried out with certain mineral and organic acids such as for example hydrochloric and acetic acids starting with a concentration of about 0.0001 M hydrochloric acid or 0.01 M acetic acid and increasing the concentration as above described until the activity is eluted.

Diameter of the column can be selected in view of the quantity of the purified intrinsic factor desired. The resin bed height can be varied widely. The process of this invention can be carried on in a batchwise manner in lieu of column use.

Starting crude intrinsic factor preparations employed in this invention can be from various sources and can receive various preliminary treatments such as contact with vitamin $B_{12}$ and the like.

I claim:

1. The process of purifying intrinsic factor which comprises hydrolysing a relatively impure intrinsic factor preparation of mammalian source with a proteolytic enzyme, contacting the hydrolysate with a carboxylic cation exchange resin buffered at a pH between about pH 4 and pH 7 to cause adsorption of intrinsic factor, washing said carboxylic cation exchange resin with an aqueous solution of increasing electrolyte concentration to cause elution fo said adsorbed intrinsic factor, said electrolyte being compatible with the resin and intrinsic factor activity, and recovering the intrinsic factor from said eluate.

2. The process of purifying intrinsic factor which comprises hydrolysing a relatively impure intrinsic factor preparation of mammalian source with pancreatin, contacting the hydrolysate with a carboxylic cation exchange resin buffered at a pH between about pH 4 and pH 7 to cause adsorption of intrinsic factor, washing said carboxylic cation exchange resin with an aqueous solution of increasing electrolyte concentration to cause elution of said adsorbed intrinsic factor, said electrolyte being compatible with the resin and intrinsic factor activity, and recovering the intrinsic factor from said eluate.

3. The process of purifying intrinsic factor which comprises hydrolysing a relatively impure intrinsic factor preparation of mammalian source with trypsin, contacting the hydrolysate with a carboxylic cation exchange resin buffered at a pH between about pH 4 and pH 7 to cause adsorption of intrinsic factor, washing said carboxylic cation exchange resin with an aqueous solution of increasing electrolyte concentration to cause elution of said adsorbed intrinsic factor, said electrolyte being compatible with the resin and intrinsic factor activity, and recovering the intrinsic factor from said eluate.

4. The process of purifying intrinsic factor which comprises hydrolysing a relatively impure intrinsic factor preparation of mammalian source with chymotrypsin, contacting the hydrolysate with a carboxylic cation exchange resin buffered at a pH between about pH 4 and pH 7 to cause adsorption of intrinsic factor, washing said carboxylic cation exchange resin with an aqueous solution of increasing electrolyte concentration to cause elution of said adsorbed intrinsic factor, said electrolyte being compatible with the resin and intrinsic factor activity, and recovering the intrinsic factor from said eluate.

5. The process of purifying intrinsic factor which comprises hydrolysing a relatively impure intrinsic factor preparation of mammalian source with a proteolytic enzyme, contacting the hydrolysate with a carboxylic cation exchange resin buffered at about pH 5.4 to cause adsorption of intrinsic factor, washing said carboxylic cation exchange resin with an aqueous solution of increasing electrolyte concentration employing gradient elution technique to cause elution of said adsorbed intrinsic factor, and recovering the intrinsic factor from said eluate.

6. The process of purifying intrinsic factor which comprises hydrolysing a relatively impure intrinsic factor preparation of mammalian source with pancreatin, contacting the hydrolysate with a carboxylic cation exchange resin buffered at about pH 5.4 to cause adsorption of intrinsic factor, washing said carboxylic cation exchange resin with an aqueous solution of increasing electrolyte concentration employing gradient elution technique to cause elution of said adsorbed intrinsic factor, and recovering the intrinsic factor from said eluate.

7. The process of purifying intrinsic factor which comprises hydrolysing a relatively impure intrinsic factor preparation of mammalian source with trypsin, contacting the hydrolysate with a carboxylic cation exchange resin buffered at about pH 5.4 to cause adsorption of intrinsic factor, washing said carboxylic cation exchange resin with an aqueous solution of increasing electrolyte concentration employing gradient elution technique to cause elution of said adsorbed intrinsic factor, and recovering the intrinsic factor from said eluate.

8. The process of purifying intrinsic factor which comprises hydrolysing a relatively impure intrinsic factor preparation of mammalian source with chymotrypsin, contacting the hydrolysate with a carboxylic cation exchange resin buffered at about pH 5.4 to cause adsorption of intrinsic factor, washing said carboxylic cation exchange resin with an aqueous solution of increasing electrolyte concentration employing gradient elution technique to cause elution of said adsorbed intrinsic factor, and recovering the intrinsic factor from said eluate.

9. The process of purifying intrinsic factor which comprises hydrolysing a relatively impure intrinsic factor preparation of mammalian source with a proteolytic enzyme, contacting the hydrolysate with a carboxylic cation exchange resin buffered at a pH between about pH 4 to pH 7 to cause adsorption of intrinsic factor, washing said resin with a like buffered aqueous solution of increasing electrolyte concentration employing gradient elution technique to cause elution of said adsorbed intrinsic factor, and recovering the intrinsic factor from said eluate.

10. The process of claim 9 in which the electrolyte of the aqueous solution used in washing the resin is a sodium salt wherein the initial concentration of sodium ion is about 0.05 M.

11. The process of purifying intrinsic factor which comprises hydrolysing a relatively impure intrinsic factor preparation of mammalian source with a proteolytic enzyme at about pH 7.8 for about five hours, wherein about 10 to about 250 mg. of the said relatively impure intrinsic factor preparation has the potency of the intrinsic factor activity of 1 U.S.P. unit, contacting the hydrolysate with carboxylic cation exchange resin to cause adsorption of intrinsic factor, said resin having been buffered at about pH 5.4 with a dilute acetate buffer having a sodium ion concentration of about 0.05 M, washing said resin with said buffer of increasing sodium ion concentration employing gradient elution technique to cause elution of said adsorbed intrinsic factor, and recovering the intrinsic factor from said eluate.

12. The process of purifying intrinsic factor which comprises hydrolysing a relatively impure intrinsic factor preparation of mammalian source with pancreatin at about pH 7.8 for about five hours, wherein about 10 to about 250 mg. of the said relatively impure intrinsic factor preparation has the potency of the intrinsic factor activity of 1 U.S.P. unit, contacting the hydrolysate with carboxylic cation exchange resin to cause adsorption of intrinsic factor, said resin having been buffered at about pH 5.4 with a dilute acetate buffer having a sodium ion concentration of about 0.05 M, washing said resin with said buffer of increasing sodium ion concentration employing gradient elution technique to cause elution of said adsorbed intrinsic factor, and recovering the intrinsic factor from said eluate.

13. The process of purifying intrinsic factor which comprises hydrolysing a relatively impure intrinsic factor preparation of mammalian source with trypsin at about pH 7.8 for about five hours, wherein about 10 to about 250 mg. of the said relatively impure intrinsic factor preparation has the potency of the intrinsic factor activity of 1 U.S.P. unit, contacting the hydrolysate with carboxylic cation exchange resin to cause adsorption of intrinsic factor, said resin having been buffered at about pH 5.4 with a dilute acetate buffer having a sodium ion concentration of about 0.05 M, washing said resin with said buffer of increasing sodium ion concentration employing gradient elution technique to cause elution of said adsorbed intrinsic factor, and recovering the intrinsic factor from said eluate.

14. The process of purifying intrinsic factor which comprises hydrolysing a relatively impure intrinsic factor preparation of mammalian source with chymotrypsin at about pH 7.8 for about five hours, wherein about 10 to about 250 mg. of the said relatively impure intrinsic factor preparation has the potency of the intrinsic factor activity of 1 U.S.P. unit, contacting the hydrolysate with carboxylic cation exchange resin to cause adsorption of intrinsic factor, said resin having been buffered at about pH 5.4 with a dilute acetate buffer having a sodium ion concentration of about 0.05 M, washing said resin with said buffer of increasing sodium ion concentration employing gradient elution technique to cause elution of said adsorbed intrinsic factor, and recovering the intrinsic factor from said eluate.

References Cited in the file of this patent

Latner: Biochem. Jour., vol. 63, May–Aug. 1956, pp. 501–507.

Williams et al.: Proc. Soc. Expt. Biol. and Med., 87(2), 1954, pp. 400–405.

Latner et al.: Biochem. Jour., 57(3), 1954, p. 19.

Amber: Hi-Lites, No. 21, March 1953, Rohm and Haas (4 pp.).